G. CARLETON.
VALVE FOR FLUID CONDUITS.
APPLICATION FILED JULY 12, 1915.
1,170,046.
Patented Feb. 1, 1916.
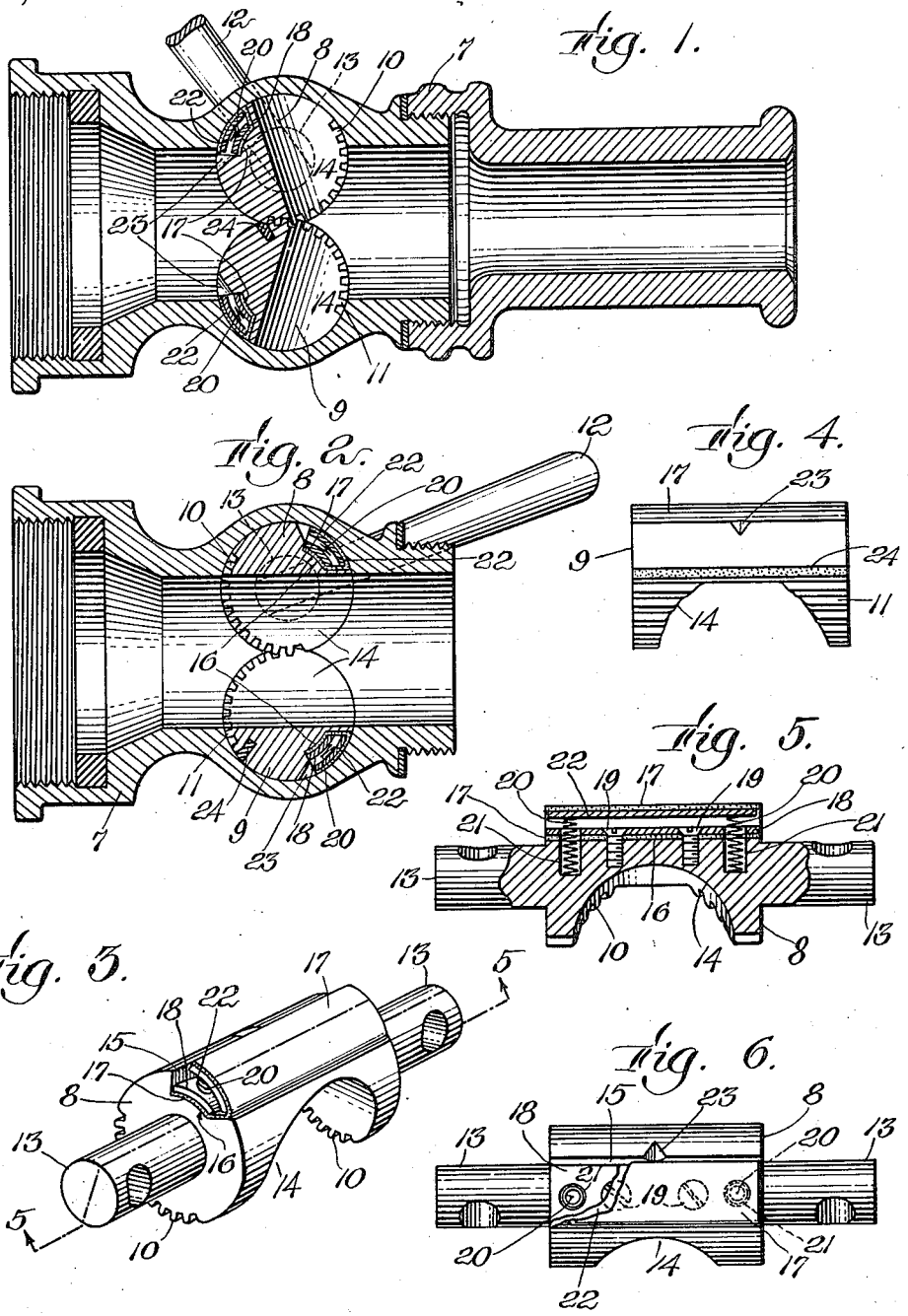

UNITED STATES PATENT OFFICE.

GUY CARLETON, OF ROCKPORT, MAINE.

VALVE FOR FLUID-CONDUITS.

1,170,046.  Specification of Letters Patent.  Patented Feb. 1, 1916.

Application filed July 12, 1915. Serial No. 39,356.

*To all whom it may concern:*

Be it known that I, GUY CARLETON, a citizen of the United States, residing at Rockport, in the county of Knox and State of Maine, have invented new and useful Improvements in Valves for Fluid-Conduits, of which the following is a specification.

My invention relates to valves for fluid conduits, and its objects are to prevent leakage and at the same time to reduce the friction of the movable parts, to utilize the pressure of the fluid for securing a fluid tight joint when the valve is closed, to render the packing accessible and readily susceptible of replacement and repair without the necessity of skilled labor or the use of special tools, to increase the durability and effectiveness of the packing, and in other ways to rearrange and render more effective the operation of the several parts.

My invention is especially adapted for use in rotary plug valves, particularly those used for the nozzles of fire hose. As is well known in the ordinary nozzle now sold on the market, such valves have been found objectionable because of the difficulty of rendering the same of sufficient tightness to prevent leaking of the water therethrough under the conditions of actual use. It is the usual practice in inserting the packing to produce such a tight fit between the plug and the adjacent wall of its chamber that it is difficult to turn the valve. After a month or so of use, however, the edges of the packing wear to such an extent that the plug becomes loose and the said packing has to be renewed, otherwise with continued use leaks are certain to occur. This is a very serious defect particularly with fire hose since the interior of buildings is likely to be damaged from drippings caused from such overflows in places where the water is not needed to an extent even beyond that occasioned by the fire. Only by constant replacement of the packing at considerable expense can such defect be obviated, a practice necessitating the sending of the hose nozzle to the repair shop at frequent intervals, and requiring the employment of skilled labor and special tools for the purpose.

My invention primarily consists in providing each of the rotary plugs with a packing leaf one edge of which is removably attached within a longitudinal groove in periphery of the plug, and the other edge of which is folded back against the direction of the flow of the water, the pressure thereof when the valve is closed serving to force the free edge of the leaf against the wall of the valve chamber and completely to prevent the egress of the fluid.

My invention further consists in other various modifications and improvements illustrated in the drawing, and hereinafter more particularly described and claimed.

Attention is hereby directed to the drawing in which similar numerals of designation refer to similar parts throughout the several views.

Figure 1 is a section of a hose nozzle with rotary plug valve embodying my invention showing the same in a closed position. Fig. 2 is a part of the same view shown in Fig. 1, showing the valve open. Fig. 3 is a view in perspective of the rotary plug to which the bail is applied. Fig. 4 is a side elevation of the other rotary plug. Fig. 5 is a section on line 5—5 of Fig. 3 looking in the direction of the arrows, and Fig. 6 is a plan view of the plug shown in Fig. 3, a portion of the packing leaf and cover being removed for the purpose of showing a part of the curved securing plate beneath.

The nozzle 7 is of the same general construction as that in common use, and is provided with the rotary plugs 8 and 9 of the type commonly used in this form of device having the intermeshing gears 10 and 11, and the bail 12 connected with the studs 13, 13, integral with one of said plugs, the said bail 12 serving to open and close the valve in the well known manner. In each of said plugs on the portion opposite to the gears 13, 13, and way 14, I cut the deep longitudinal groove 15 which as will be seen by inspection of Fig. 3 is segmental in cross section and has at the bottom thereof the convex surface 16. Within the said groove upon said surface 16, I affix one edge of the packing leaf 17, by means of the curved plate 18 through which pass the set screws 19, 19, serving to secure both said plate and leaf firmly to the plug. Preferably the plate 18 is shaped to conform to the curved bottom of the groove, in order to provide a water tight joint when said screws are in their proper position. (See Fig. 5).

The packing leaf 17 is of sufficient width to admit of one edge being secured as above set forth and to fold backwardly upon the top of the groove 15 and completely to cover the same. For the purpose of holding open the free edge of said leaf, I prefer to provide the springs 20, 20, which are seated in the recesses 21, 21, and protrude through openings provided therefor in both the said leaf 17 and the securing plate 18. In order to prevent the packing leaf from being worn by the ends of said springs and to keep the same evenly distended, I prefer to use the curved cover 22 which is slightly shorter than the length of the groove and of a width loosely to fit therein. For the purpose of facilitating the ingress of the water, I preferably provide the groove 23 in the plug 8 immediately adjacent to the free edge of the packing leaf.

While I find it of advantage to avail myself of the mechanical means above described for holding open the packing leaf 17, and for forcing the same against the adjacent wall of the nozzle in order that the water of the conduit may by no possibility have a tendency to pass over rather than under the same, I do not consider said means essential to the proper operation of my invention in its broadest sense, although such means undoubtedly materially coöperate to the effectiveness of my improved device. Even without said mechanical means, however, the tendency of the pressure of the water will tend to hold open the said leaf and to prevent leaking of the water therethrough.

For the purpose of further aiding in tightening the nozzle, when closed, I also provide the packing 24, which is introduced within a groove in the plug 9, in close proximity to the gear thereof and opposite to the last tooth of the gear upon the opposite plug.

When the valve is closed as shown in Fig. 1, the pressure of the water is directed against the inside of each packing leaf 17, both the springs 20 and the grooves 23, contributing to hold open the same, the result being to utilize the pressure of the water to force the edge of said leaf firmly against the adjacent wall of the nozzle, and to present in the fold of said leaf an effectual obstruction to the passage of the water. At the same time the packing 24 prevents egress of the water between the plugs. As will be observed, the segmental groove and edge of the packing leaf are so located that upon the valve being closed, they are in the best possible position for the effective application of the pressure of the water for the purpose above described.

By constructing the packing leaf with a wide free edge as shown in the drawing, a considerable wearing surface is afforded and is better distributed than with the ordinary form of packing heretofore used, and even where my improved packing becomes worn there is no diminution in the tightness of the same as is the case with ordinary form. Then again, should it be desired to replace the packing, any person with an ordinary screw driver could in a very short time effect such substitution without the necessity of special tools or sending the nozzle to the repair shop.

While I have described my invention as especially applied to rotary plug hose nozzles, I by no means desire to limit my invention to such application, it being obvious that other uses, modifications and adaptations could be made of my invention without departing from the spirit or scope thereof.

What I claim and desire to secure by Letters Patent is as follows:

1. In a rotary valve for fluid conduits, a rotary plug having a longitudinal groove therein, and a leather packing strip of substantial width one portion of which is secured within said groove and the free portion of which is folded back over said groove against the direction of the flow of the fluid and is in close contact with the adjacent wall of the conduit, thereby preventing the passage of the fluid between said wall and said rotary plug.

2. In a rotary valve for fluid conduits, a rotary plug having a groove extending in the same direction as its axis of rotation, a leather packing strip of substantial width one edge of which is secured within said groove, the free portion of which is folded back against the direction of the flow of the fluid, mechanical means for holding open to the ingress of said fluid the edge of said free portion of said strip, thereby utilizing the pressure of the fluid to force the free portion of the packing strip against the wall of the conduit and to prevent the passage of the fluid between said plug and the adjacent wall of said conduit.

3. In a rotary valve for fluid conduits, a rotary plug having a longitudinal groove therein, a leather packing strip one edge of which is secured in said groove leaving a free portion of substantial width folded back upon said groove against the direction of the fluid, and mechanical means for holding open the free portion of said leaf and forcing the same into close contact with the adjacent wall of the conduit, thereby preventing the passage of the fluid between said wall and said rotary plug.

4. In a rotary valve for fluid conduits, a rotary plug having a longitudinal groove therein segmental in cross section and convex at the bottom, a leather packing strip of substantial width, a plate shaped to conform with said convex bottom and securing one edge of said packing strip within said groove, the said packing having a free portion folded back over said groove against the flow of said fluid, and mechanical means for holding open to the ingress of the fluid the free edge of said packing strip, thereby utilizing the pressure of the fluid to force the free portion of the packing strip against the wall of the conduit, and preventing the passage of the fluid between the said wall and said rotary plug.

In testimony whereof I have hereunto set my hand in presence of two subscribing witnesses, this 10th day of July, 1915.

GUY CARLETON.

Witnesses:
CHESTER REYNOLDS,
FRED L. CURTIS.